United States Patent [19]

Harada

[11] 4,027,327
[45] May 31, 1977

[54] VIEW FINDER FOR REFLEX CAMERA

[75] Inventor: Yuho Harada, Omiya, Japan

[73] Assignee: Fuji Photo Optical Co., Ltd., Omiya, Japan

[22] Filed: Aug. 4, 1975

[21] Appl. No.: 601,431

[30] Foreign Application Priority Data

Aug. 9, 1974 Japan .............................. 49-91368

[52] U.S. Cl. .............................. 354/201; 354/155; 354/199; 354/224
[51] Int. Cl.² ........................................ G03B 13/08
[58] Field of Search .......... 354/199, 200, 201, 219, 354/224, 225, 155; 355/2; 350/3.5, 162 ZP

[56] References Cited
UNITED STATES PATENTS

| | | |
|---|---|---|
| 3,149,547 | 9/1964 | Jurenz .......................... 354/199 X |
| 3,218,948 | 11/1965 | Küppenbender .................. 354/224 |
| 3,500,736 | 3/1970 | Ewald .............................. 354/199 |
| 3,609,027 | 9/1971 | Lowenthal .................. 350/162 ZP |
| 3,630,134 | 12/1971 | Nakamura ........................ 354/224 |
| 3,807,829 | 4/1974 | Close .......................... 350/162 ZP |
| 3,915,548 | 10/1975 | Opittek et al. .................... 350/3.5 |

Primary Examiner—L. T. Hix
Assistant Examiner—Alan Mathews

[57] ABSTRACT

A holographic lens which functions to converge light passing therethrough is located on a plane equivalent to the focal plane of a taking lens of a reflex camera. An image of the object is formed on the holographic lens and viewed in enlarged scale through an eyepiece. The light passing through the holographic lens is converged to the eyepiece so that a uniformly bright image of the object formed on the holographic lens may be viewed through the eyepiece.

5 Claims, 2 Drawing Figures

VIEW FINDER FOR REFLEX CAMERA

BACKGROUND OF THE INVENTION

1. Field of the Invention

This invention relates to a view finder for a reflex camera, and more particularly to an improvement in an optical system of a view finder for a reflex type photographic camera wherein the light passing through a taking lens thereof is put into the view finder system for focusing images on a focusing plate in the view finder system.

2. Description of the Prior Art

In the conventional reflex type photographic cameras, a focusing plate is located at a position equivalent to the focal plane of the taking lens thereof, i.e., the film plane, and the image focused on the focusing plate is viewed in enlarged scale with a magnifier. As the focusing plate there is used a diffusion plate. The diffusion plate is required to be capable of visualizing an image with high resolution and to have uniform brightness over the whole area thereof. For instance, a diffusion plate such as a glass plate or a plastic plate one surface of which is grounded with fine grains of sand or roughened by chemical etching process is used as the focusing plate.

The above described focusing plate suffers from the defect that the marginal portion of the image focused thereon is dark while the central part thereof is comparatively bright, since the amount of light diffused thereby is markedly small in the marginal portion thereof.

In order to avoid the above defect, it has been known in the art to provide a convergent lens adjacent to the focusing plate to direct the light in the marginal portion of the focusing plate toward the eyepiece of the view finder system. Further, it has also been known to form a Fresnel lens on one surface of the focusing plate to enhance the brightness of the image focused thereon and viewed through the view finder. By using the focusing plate having the Fresnel lens on one face thereof the power of the convergent lens located adjacent to the focusing plate can be lowered or the convergent lens can be eliminated and accordingly the weight of the view finder can be lowered and the height of the view finder portion of the camera can be reduced.

However, the above described view finder employing a focusing plate having a Fresnel lens on one face thereof is disadvantageous in that the quality of the image viewed through the view finder is degraded by a number of concentric circles of surface irregularity which exist on the Fresnel lens and which are observed on the roughened surface of the focusing plate glittering thereon. Further, in this type of view finder, the quality of the image is degraded by boundary lines of a prism attached to the focusing plate for focus adjustment which are formed on the roughened face of the focusing plate and can be observed by the photographer through the view finder. Owing to such noise appearing on the focusing plate, the focus adjustment operation is markedly disturbed.

SUMMARY OF THE INVENTION

In view of the above described defects inherent in the conventional view finder, the primary object of the present invention is to provide a view finder for a camera in which images of high quality can be observed therethrough.

Another object of the present invention is to provide a view finder for a camera which occupies a small space and accordingly makes the camera compact in size.

Still another object of the present invention is to provide a view finder for a camera which is small in weight and accordingly makes the camera light in weight.

The view finder in accordance with the present invention employs a holographic lens located on the focusing plane which is optically equivalent to the film plane. The holographic lens does not have a roughened surface, and accordingly, the brightness of the image focused by the light passing therethrough is not lowered. Further, the holographic lens is advantageous in that the weight and the thickness thereof is very small and accordingly the weight and the size of the camera can be considerably reduced.

DESCRIPTION OF THE PREFERRED EMBODIMENTS

Figure 1:
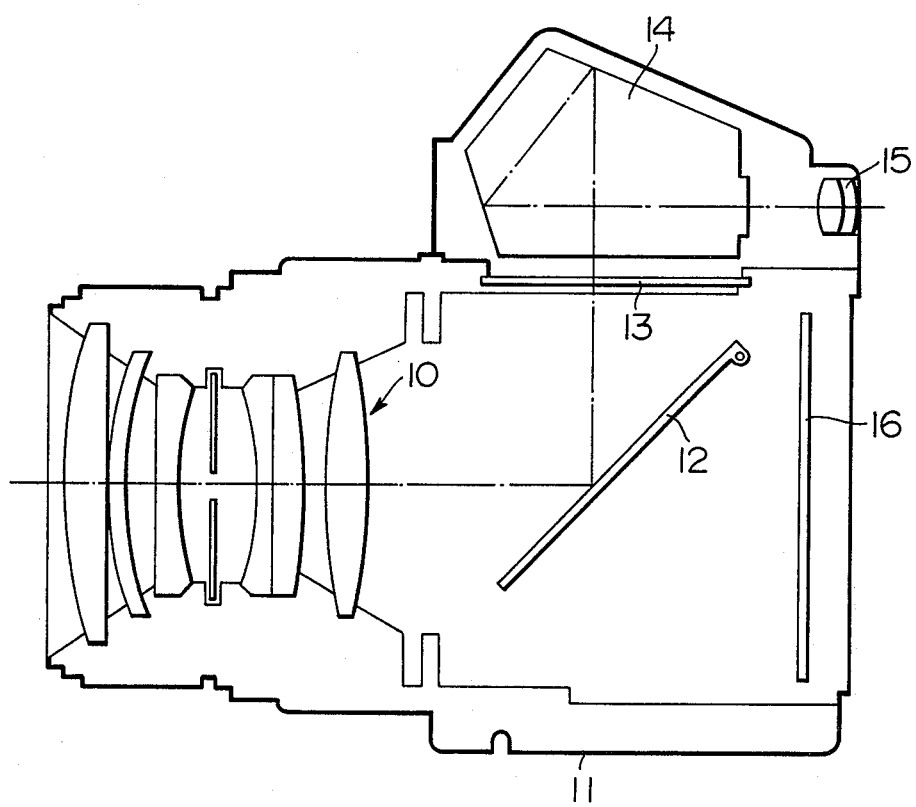
FIG. 1 is a schematic longitudinal sectional view showing a camera employing an embodiment of the view finder in accordance with the present invention.

A single lens reflex camera employing an embodiment of the view finder in accordance with the present invention is shown in FIG. 1. The camera is provided with a taking lens 10 mounted on the front face of a camera body 11, a mirror 12 swingably located behind the taking lens 10, a focusing plate 13 horizontally located above the mirror 12 to receive light reflected from said mirror 12, a pentagonal prism 14 located above the focusing plate 14 and an eyepiece 15 located behind the prism 14. The focusing plate 13 is located at a position optically equivalent to the focal plane of the taking lens 10 on which a photographic film 16 is positioned. The optical system of the view finder is not different from the conventional one employed in the conventional cameras. Namely, the light passing through the taking lens 10 of the camera is reflected by the mirror 12 and focused on the focusing plate 13. The image focused on the focusing plate 13 is viewed in enlarged scale by means of a magnifier, i.e., an eyepiece 15. The light from the focusing plate 13 is reflected twice in the pentagonal prism 14 and directed horizontally backward therefrom toward the eyepiece 15.

In the view finder of the present invention, said focusing plate 13 is made of a holographic lens which functions to converge the light passing therethrough. The holographic lens is as thin as the conventionally employed Fresnel lens and is capable of converging the light passing therethrough like the ordinary convex lens. Such a holographic lens is holographically made by recording an interference pattern formed on a photographic recording medium such as a photographic plate bearing an emulsion layer thereon by use of a diverging coherent light beam and a converging coherent light beam which form the interference pattern on said medium. In the holographic recording process used to make the holographic lens, the distance from the diverging point of the diverging coherent light beam to the recording medium is set to be equal to the distance between the stop of the taking lens and the holographic lens in the camera, and the distance from the recording medium to the converging point is set to be equal to the distance between the holographic lens and the eyepiece.

By use of the holographic lens 13 located on the equivalent focusing plane, the diverging light from the taking lens 10 incident on the holographic lens 13 is converged to the eyepiece 15. Therefore, the marginal portion of the image formed on the holographic lens viewed through the eyepiece is not darkened. Further, since the holographic lens does not have concentric circles of surface irregularity, the quality of the image formed on the focusing plate 13 is not degraded.

The holographic lens is preferably located on the focal plane. However, if lateral chromatic aberration can easily be corrected, the holographic lens need not necessarily be located on the focal plane. The holographic lens may be provided with a small prism for making a split image thereon to facilitate the focus adjustment of the image.

Figure 2:
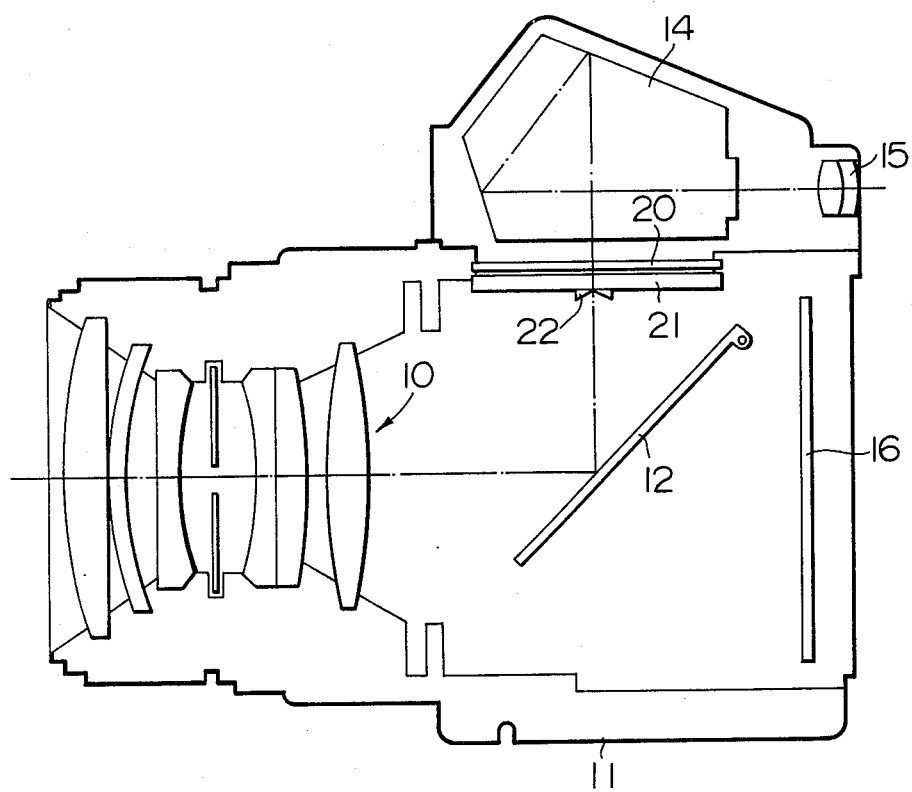
FIG. 2 is a schematic longitudinal sectional view showing a camera employing another embodiment of the view finder of the present invention in which a focusing plate is used together with a holographic lens.

A second embodiment of the present invention is illustrated in FIG. 2 wherein elements identical to those shown in FIG. 1 are designated with the same reference numerals and the description thereof is omitted here. In the second embodiment, a diffusion plate 21 is provided in parallel to a holographic lens 20 in the vicinity thereof so that the light from the mirror 12 may be diffused by the diffusion plate 21 and converged by the holographic lens 20. In this case, the diffusion plate 21 serves as a focusing plate and is located on said equivalent focusing plane. Further, in the second embodiment of the invention, a small prism 22 for making a split image is provided on the surface of the diffusion plate 21.

The holographic lens is further advantageous in that marks or characters can be recorded thereon together with the hologram when the holographic lens is made from a photographic recording medium such as a photographic plate.

I claim:

1. A view finder for a reflex camera comprising a mirror located behind a taking lens of the camera to receive light passing through the taking lens and reflect the light, a holographic lens provided in said camera to receive the light reflected from said mirror and having a function to converge the light passing therethrough, said holographic lens being located substantially on a plane equivalent to the focal plane of the taking lens, and an eyepiece located optically behind said holographic lens to which the light from the holographic lens converges.

2. A view finder for a reflex camera as defined in claim 1 wherein said holographic plate is provided with a prism for making a split image.

3. A view finder for a reflex camera as defined in claim 1 wherein said holographic lens is made of a photographic recording material and has sign or character information photographically recorded thereon.

4. A view finder for a reflex camera as defined in claim 1 further comprising a diffusion plate located on said plane equivalent to the focal plane of the taking lens in parallel to said holographic lens.

5. A view finder for a reflex camera as defined in claim 4 wherein said diffusion plate is provided with a prism for making a split image.

* * * * *